United States Patent
Popescu-Stroe et al.

(10) Patent No.: US 11,832,070 B2
(45) Date of Patent: Nov. 28, 2023

(54) MICROPHONE DEVICES AND METHODS FOR OPERATING THEREOF

(71) Applicant: Infineon Technologies AG, Neubiberg (DE)

(72) Inventors: Victor Popescu-Stroe, Bucharest (RO); Matthias Boehm, Putzbrunn (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/552,817

(22) Filed: Dec. 16, 2021

(65) Prior Publication Data
US 2022/0225021 A1 Jul. 14, 2022

(30) Foreign Application Priority Data
Jan. 8, 2021 (DE) .......................... 102021100208.7

(51) Int. Cl.
*H04R 3/00* (2006.01)
*H04R 1/40* (2006.01)
*G10L 21/0216* (2013.01)

(52) U.S. Cl.
CPC .......... *H04R 3/005* (2013.01); *G10L 21/0216* (2013.01); *H04R 1/406* (2013.01); *G10L 2021/02166* (2013.01); *H04R 2499/13* (2013.01)

(58) Field of Classification Search
CPC .......... H04R 29/004; H04R 1/04; H04R 1/08; H04R 3/005; H04R 2420/09; G10L 21/0126; G10L 2021/02166
USPC ................................ 381/10, 56, 58, 80, 123
See application file for complete search history.

(56) References Cited

U.S. PATENT DOCUMENTS

| | | | |
|---|---|---|---|
| 2012/0243559 A1* | 9/2012 | Pan | H04J 3/1605 370/503 |
| 2013/0121505 A1 | 5/2013 | Duraiswami et al. | |
| 2014/0254837 A1 | 9/2014 | Mortensen et al. | |
| 2015/0365754 A1 | 12/2015 | Perl | |
| 2017/0308352 A1* | 10/2017 | Kessler | H04R 3/005 |
| 2019/0139531 A1 | 5/2019 | Kim | |

FOREIGN PATENT DOCUMENTS

CN 211335863 U 8/2020

OTHER PUBLICATIONS

EE, Feedback on daisy chained SPI Sensors (Year: 2020).*
AD7767 Data sheet, Analog Devices, 24-Bit, 8.5 mW, 109 dB, 128 kSPS/64 kSPS/32 KSPS ADCs, 2014, 24 pages.

* cited by examiner

Primary Examiner — William A Jerez Lora
(74) Attorney, Agent, or Firm — Harrity & Harrity, LLP

(57) ABSTRACT

A microphone device includes a number N of at least two serially coupled microphones forming a microphone chain. The microphones are configured to transmit data to a controller via the microphone chain. The microphone chain is configured to output time-multiplexed data transmitted by the microphones.

20 Claims, 2 Drawing Sheets

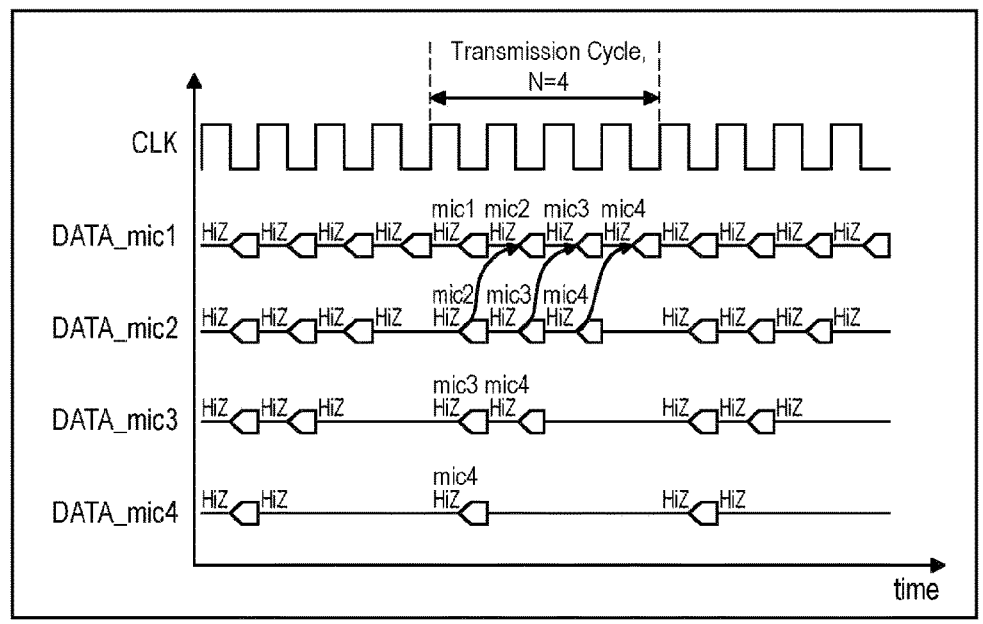
Fig. 4
Transmitting data from microphones of a microphone chain to a controller via the microphone chain, wherein the microphone chain is configured to output time-multiplexed data transmitted by the microphones — 26
Fig. 5
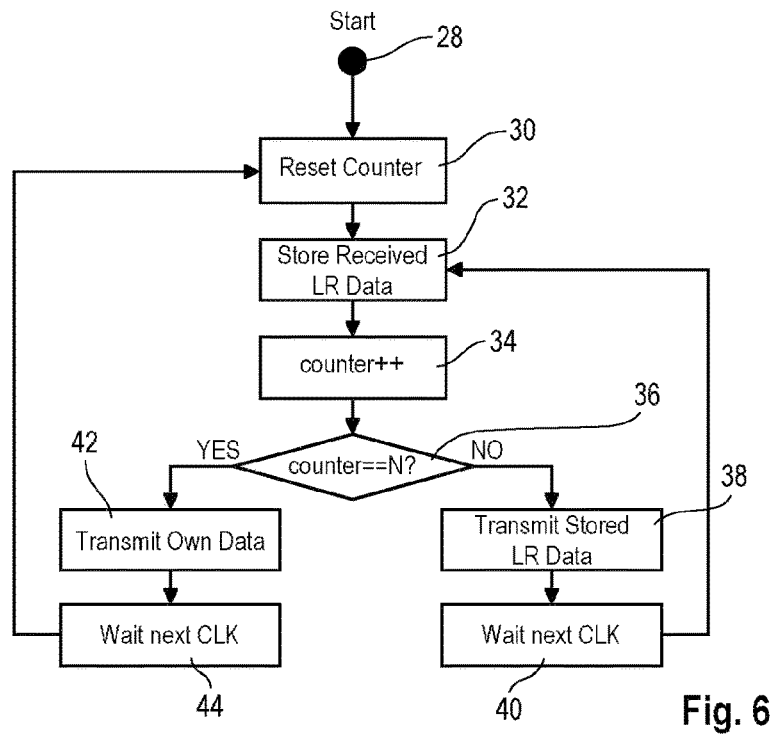
Fig. 6

MICROPHONE DEVICES AND METHODS FOR OPERATING THEREOF

RELATED APPLICATION

This application claims priority to German Patent Application No. 102021100208.7, filed on Jan. 8, 2021, which is incorporated herein by reference in its entirety.

FIELD

The present disclosure relates to microphone devices. In addition, the present disclosure relates to methods for operation such microphone devices.

BACKGROUND

In many applications, such as e.g. automotive applications, microphone sensors including microphone arrays may be used. Microphone sensors may thus include multiple digital microphones that may communicate with a controller. The usage of multiple microphones may multiply the number of required wires and may therefore increase the costs and logistics of wires in the respective application. Manufacturers of microphone devices are constantly striving to improve their products and methods for operating thereof. In particular, it may be desirable to provide microphone devices and methods for operating thereof providing reduced costs and logistics.

SUMMARY

An aspect of the present disclosure relates to a microphone device. The microphone device includes a number N of at least two serially coupled microphones forming a microphone chain. The microphones are configured to transmit data to a controller via the microphone chain. The microphone chain is configured to output time-multiplexed data transmitted by the microphones.

An aspect of the present disclosure relates to a method for operating a microphone device including a number N of at least two serially coupled microphones forming a microphone chain. The method includes transmitting data from the microphones to a controller via the microphone chain, wherein the microphone chain is configured to output time-multiplexed data transmitted by the microphones.

BRIEF DESCRIPTION OF THE DRAWINGS

Microphone devices and methods for operating thereof in accordance with the disclosure will be explained in more detail below based on the drawings. Like reference signs may designate corresponding similar parts.

FIG. 4 illustrates a timing diagram for transmitting data between multiple microphones and a controller in accordance with the disclosure.

FIG. 5 illustrates a flow diagram of a method for operating a microphone device in accordance with the disclosure.

FIG. 6 illustrates a flow diagram of a method for operating a microphone device in accordance with the disclosure.

DETAILED DESCRIPTION

The drawings schematically illustrate microphone devices and methods for operating thereof in a general manner in order to qualitatively specify aspects of the disclosure. It is understood that the devices and methods may include further aspects which are not illustrated for the sake of simplicity. For example, each of the devices and methods may be extended by any of the aspects described in connection with other examples described herein.

Microphone devices (or microphone sensors) in accordance with the disclosure may be used in various applications. In one example, the microphone devices may be configured to be part of a speech application, such as e.g. a hands-free calling application, a voice recognition application, an emergency application, etc. In a further example, the microphone devices may be configured to be part of an active noise cancellation application. In particular, the microphone devices described herein may be part of an automotive application.

Figure 1:
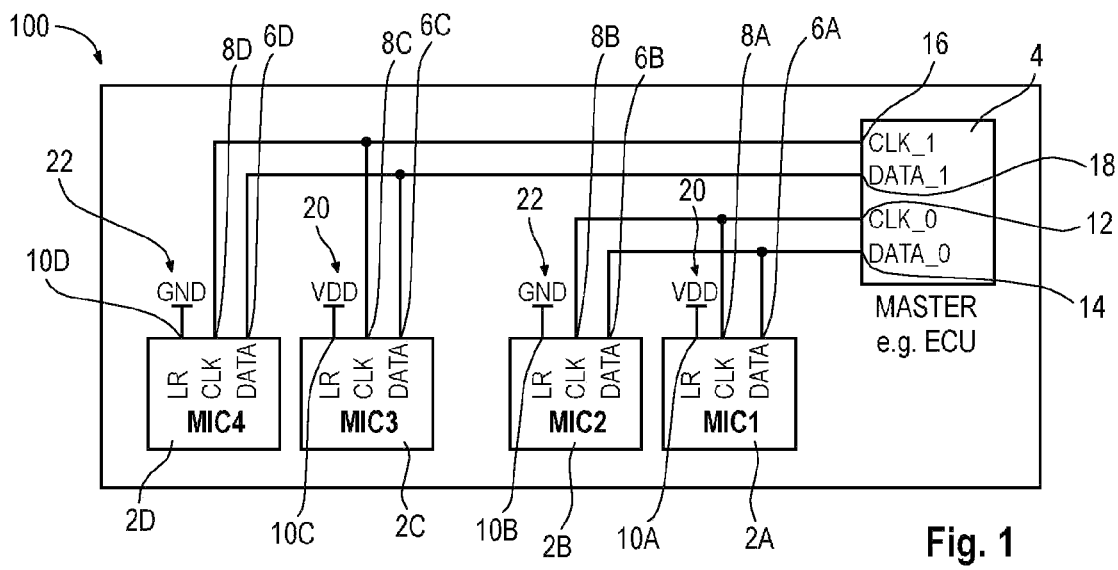
FIG. 1 schematically illustrates a microphone device 100.

The microphone device 100 of FIG. 1 may include multiple microphones 2A to 2D (see MIC1 to MIC4). In the example of FIG. 1, the microphone device 100 may include an exemplary number of four microphones. In further examples, the number of microphones may differ. The microphones 2A to 2D may include any type of suitable digital pressure sensor or digital pressure transducer. In particular, the microphones 2A to 2D may correspond to MEMS (Micro Electro Mechanical Systems) microphones. The microphones 2A to 2D may be manufactured from a semiconductor material, such as e.g. silicon. In the example of FIG. 1, each of the microphones 2A to 2D may include three terminals (or pins) 6 to 10. It is understood that each of the microphones 2A to 2D may include further pins which are not discussed herein for the sake of simplicity. The microphones 2A to 2D may be mounted on a same board or not.

The microphone device 100 may further include a controller 4 or not. The controller 4 may also be referred to as host device and/or master. For example, the controller 4 may include at least one of an ECU (Electronic Control Unit), an ECM (Electronic Control Module), a digital signal processor, etc. In the example of FIG. 1, the controller 4 may include four terminals (or pins) 12 to 18. It is understood that the controller 4 may include further pins which are not discussed herein for the sake of simplicity. The controller 4 may be mounted on the same board as the microphones 2A to 2D or not.

A data pin 6A of the first microphone 2A (see DATA) may be connected to a data pin 14 of the controller 4 (see DATA_0). A clock pin 8A of the first microphone 2A (see CLK) may be connected to a clock pin 12 of the controller 4 (see CLK_0). A channel select pin 10A, such as e.g. an LR (Left/Right) pin (see LR), of the first microphone 2A may be connected to a supply voltage 20 (see VDD). The pins 6B to 10B of the second microphone 2B may be similar to the corresponding pins of the first microphone 2A and may be connected in a similar fashion. In contrast to the first microphone 2A, the channel select pin 10B of the second microphone 2B may be connected to a ground potential 22 (see GND).

A data pin 6C of the third microphone 2C may be connected to a data pin 18 of the controller 4 (see DATA_1). A clock pin 8C of the third microphone 2C may be connected to a clock pin 16 of the controller 4 (see CLK_1). A channel select pin 10C of the third microphone 2C may be connected to a supply voltage 20. The pins 6D to 10D of the fourth microphone 2D may be similar to the corresponding pins of the third microphone 2C and may be connected in a similar fashion. In contrast to the third microphone 2C, the channel select pin 10D of the fourth microphone 2D may be connected to a ground potential 22.

The microphones 2A to 2D may be configured to sense incoming sound (or pressure) signals and convert the sensed signals to acoustic (or audio) data, in particular digital acoustic data. The digital acoustic data may be transmitted from the microphones 2A to 2D to the controller 4 based on a suitable interface, such as e.g. a PDM (Pulse Density Modulation) interface or an I²S (Inter-IC Sound) interface. A PDM interface may be a 1-bit interface which may not require having a decimator in the microphones, resulting in reduced chip area, cost and current consumption in the microphones. A delay caused by an analog-to-digital conversion may be comparatively small in PDM microphones. A PDM interface may be based on two interface signals: Clock and Data. The channel select pins 10A and 10B may enable using the two microphones 2A and 2B in a same data line by connecting the channel select pins 10A and 10B to either the supply voltage 20 or the ground potential 22 as exemplarily shown in FIG. 1. In a similar fashion, the channel select pins 10C and 10D may enable using the two microphones 2C and 2D in a same data line by connecting the channel select pins 10C and 10D to either the supply voltage 20 or the ground potential 22.

Figure 2:
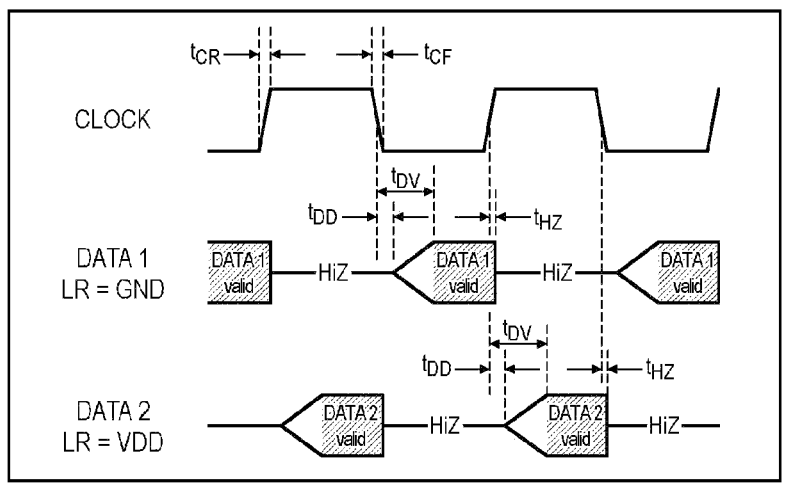
FIG. 2 illustrates a timing diagram for transmitting data between two microphones and a controller.

A possible transmission of data between the microphones 2A, 2B and the controller 4 is specified in connection with FIG. 2. A similar data transmission may be performed between the microphones 2C, 2D and the controller 4. The controller 4 may be configured to provide a clock signal (see CLK_0 in FIG. 1 and CLOCK in FIG. 2) to each of the microphones 2A and 2B. A data communication between the microphones 2A, 2B and the controller 4 may be based on such clock signal. For example, a PDM clock frequency may be in a range from about 0.35 MHz to about 3.3 MHz. During each clock cycle the clock signal may provide a rising edge and a falling edge. The clock signal may rise to a clock high during a clock rise time $t_{CR}$ which may be in a range from about 11 nanoseconds to about 15 nanoseconds, more particular from about 12 nanoseconds to about 14 nanoseconds in one example. The clock signal may fall to a clock low during a clock fall time $t_{CF}$ which may be similar to the clock rise time $t_{CR}$.

A transmission of data between the microphones 2A, 2B and the controller 4 may be based on channel multiplexing, such as e.g. an LR (Left/Right) channel multiplexing, which may be performed by using the rising clock signal edges and the falling clock signal edges to drive the two microphones 2A and 2B. This way, a first data channel configured for a transmission of data between the first microphone 2A and the controller 4 as well as a second data channel configured for a transmission of data between the second microphone 2B and the controller 4 may be provided.

The multiplexing may work such that at each clock edge one of the microphones 2A and 2B is transmitting and the other microphone is in a high-impedance state HiZ. A first data channel may be based on a rising edge of the clock signal. For example, at a rising edge of the clock signal, the second data channel DATA 2 may write data onto the data line and the first data channel DATA 1 may go into the high-impedance state HiZ. In a similar fashion, the first data channel DATA 1 may be based on the falling edge of the clock signal. That is, at the falling edge of the clock signal, the first data channel DATA 1 may write data while the second data channel DATA 2 may go into a high-impedance state HiZ. When in the high-impedance state HiZ, the respective microphone may be electrically invisible to the output data line. This may allow each of the microphones 2A and 2B to drive the contents of the data line while the respective other microphone may be in the high-impedance state HiZ and may wait quietly for its turn. Note that in this regard data of the first data channel DATA 1 and data of the second data channel DATA 2 may be transmitted via a same data line, in particular a wired-or data line.

Several delay times may occur during a data transmission via the two data channels DATA 1 and DATA 2 as exemplarily shown in FIG. 2. A time $t_{DD}$ may correspond to a delay time from when the clock edge is at 50% of the supply voltage (i.e. 0.5×VDD) to when data is driven on the data line. Further, a time $t_{DV}$ may correspond to a delay time from when the clock edge is at 0.5×VDD to when the data driven by the respective microphone on the respective data channel line is valid (i.e. accurately readable). In addition, a time $t_{HZ}$ may correspond to a delay time from when the clock edge is at 0.5×VDD to when the data output of the respective microphone switches into the high impedance state HiZ. In the high-impedance state HiZ the microphone may allow the other microphone to drive the data line.

Figure 3:
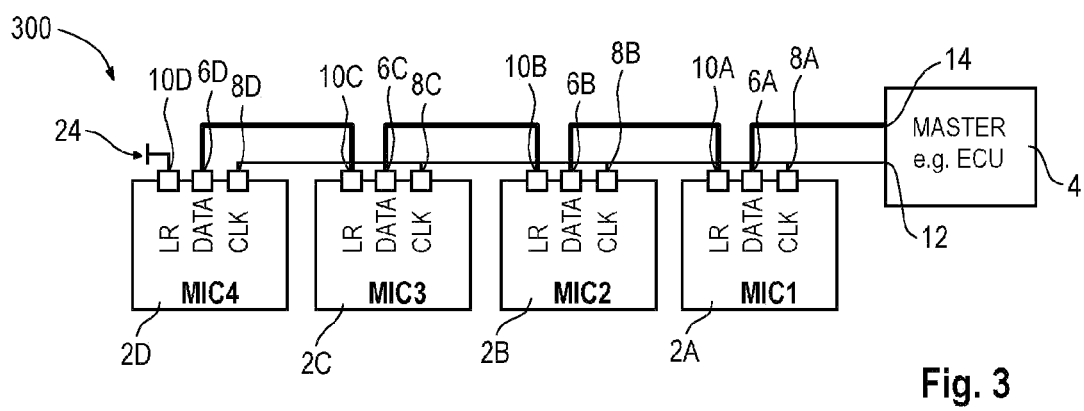
FIG. 3 schematically illustrates a microphone device 300 in accordance with the disclosure.

The microphone device 300 of FIG. 3 may include components similar to FIG. 1. Comments in connection with FIGS. 1 and 2 may thus also hold true for FIG. 3. The microphone device 300 of FIG. 3 may include a number N of at least two microphones 2A to 2D (see MIC1 to MIC4) and a controller 4. The controller 4 may be seen as part of the microphone device 300 or not. In the example of FIG. 3, the microphone device 300 may include an exemplary number N of four microphones 2A to 2D. In further examples, the number N of microphones may differ arbitrarily. In particular, 2≤N≤8. The microphones 2A to 2D may be serially coupled and may form a microphone chain (or a microphone array). The microphone chain may also be referred to as microphone daisy chain. The microphones 2A to 2D and the controller 4 may be similar to corresponding components of FIG. 1.

The controller 4 may be configured to provide (or output) an external clock signal having an external clock rate CLK at a clock pin 12. Each of the microphones 2A to 2D may include a clock pin 8 for receiving the external clock signal from the controller 4. In addition, each of the microphones 2A to 2D may include a data output 6 configured to provide data to a component arranged downstream of the respective microphone, as well as a data input 10 configured to receive data from a component arranged upstream of the respective microphone. In particular, the data input 10 of a respective microphone may include a channel select pin of the microphone. That is, an existing channel select pin of the microphone may be used as a data input such that no additional input pin may be required.

The first microphone 2A of the microphone chain may be arranged at the right end of the microphone chain. The data output 6A of the first microphone 2A may be coupled to a data pin 14 of the controller 4. In addition, the data input 10A of the first microphone 2A may be coupled to a data output 6B of the second microphone 2B arranged upstream of the first microphone 2A.

The fourth (or N-th) microphone 2D of the microphone chain may be arranged at the opposite end of the microphone chain. The data input 10D of the fourth microphone 2D may be coupled to a defined potential 24. For example, the defined potential 24 may correspond to a supply voltage 20 or a ground potential 22 as previously described in connection with FIG. 1. In addition, a data output 6D of the fourth microphone 2D may be coupled to a data input 10C of the third microphone 2C arranged downstream of the fourth microphone 2D.

For each microphone of the microphone chain arranged between the first microphone 2A and the fourth microphone 2D, a data input of the respective microphone may be coupled to an output of the microphone arranged upstream of the respective microphone. In addition, a data output of the respective microphone may be coupled to an input of the microphone arranged downstream of the respective microphone.

Each of the microphones 2A to 2D may be configured to transmit data to the controller 4 via the microphone chain. In this regard, the microphone chain may be configured to output time-multiplexed data to the controller 4 as will be described in more detail in connection with FIG. 4 later on. The time-multiplexed data may be output to the controller 4 at the data output 6A of the first microphone 2A.

Each of the microphones 2A to 2D may be configured to receive the external clock signal provided by the controller 4 and transmit data to the controller 4 based on the external clock signal. The external clock rate CLK of the external clock signal may be higher than a multiplexing clock rate Fclk used for time-multiplexing the data transmitted by the microphones 2A to 2D. In particular, the external clock rate CLK may be N-times higher than the multiplexing clock rate Fclk. For example, the multiplexing clock rate Fclk may be in a range from about 0.35 MHz to about 3.3 MHz. An exemplary specific value for the multiplexing clock rate Fclk may be about 1.5 MHz or about 3 MHZ.

Each of the microphones 2A to 2D may be configured to internally convert (or downscale or downsample) the external clock rate CLK of the external clock signal to the multiplexing clock rate Fclk. Each of the microphones 2A to 2D may further be configured to use this downscaled clock signal for an internal audio processing, such as e.g. filtering, signal processing, sound processing, etc. In a first example, the number N of microphones in the microphone chain may be fixed and each of the microphones 2A to 2D may downscale the external clock rate CLK with N, wherein N is known to the respective microphone. The value of N may e.g. be stored in a non-volatile memory of the respective microphone or an external non-volatile memory which may be accessed by the respective microphone. In a second example, the operating clock rate of the microphones (or the multiplexing clock rate Fclk) may be fixed. The value of Fclk may e.g. be stored in a non-volatile memory of the respective microphone or an external non-volatile memory which may be accessed by the respective microphone. Each of the microphones 2A to 2D may then determine N, for example by using a pre-existing Fclk detector concept.

FIG. 4 illustrates a possible transmission of data between the microphones 2A to 2D of the microphone chain and the controller 4. The external clock signal provided by the controller 4 is illustrated in a first line (see CLK). Four further lines (see DATA_mic1 to DATA_mic4) illustrate data transmitted by each of the microphones 2A to 2D. The five lines are plotted against a time axis (see time). FIG. 4 shows three transmission cycles, each including N (i.e. four) clock periods. A transmission cycle may have a length of T=1/Fclk. In the following, a data transmission for the middle transmission cycle is specified. Here, during one clock period, each of the microphones 2A to 2D may transmit (or output) one bit at its data output and, at the same time, receive one bit at its data input.

At the first clock period, each of the microphones 2A to 2D may transmit its own data (e.g. data generated by the respective microphone) to the component arranged downstream of the respective microphone. That is, the fourth microphone 2D may transmit data to the third microphone 2C, the third microphone 2C may transmit data to the second microphone 2B, the second microphone 2B may transmit data to the first microphone 2A, and the first microphone 2A may transmit data to the controller 4.

At the following clock periods, each of the microphones 2A to 2D may transmit data received at the previous clock period to a component arranged downstream of the respective microphone. In FIG. 4, an exemplary transmission of data from the second microphone 2B to the first microphone 2A is indicated by arrows.

At the second clock period, the fourth microphone 2D may not necessarily transmit data, because the fourth microphone 2D may have not received data at the previous first clock period. The third microphone 2C may transmit data previously received from the fourth microphone 2D to the second microphone 2B, the second microphone 2B may transmit data previously received from the third microphone 2C to the first microphone 2A, and the first microphone 2A may transmit data previously received from the second microphone 2B to the controller 4.

At the third clock period, the third microphone 2C and the fourth microphone 2D may not necessarily transmit data, because these microphones may have not received data at the previous second clock period. The second microphone 2B may transmit data previously generated by the fourth microphone 2D to the first microphone 2A, and the first microphone 2A may transmit data previously generated by the third microphone 2C to the controller 4.

At the fourth clock period, the second microphone 2B, the third microphone 2C and the fourth microphone 2D may not necessarily transmit data, because these microphones may have not received data at the previous third clock period. The first microphone 2A may transmit data previously generated by the fourth microphone 2D to the controller 4.

By serially transmitting data via the microphone chain as described above, the microphone chain may output time-multiplexed data (in particular bit-level time-multiplexed data) generated by the microphones 2A to 2D. For N (i.e. four) consecutive clock periods of the external clock signal, an output of the microphone chain may include data provided by each of the N (i.e. four) microphones 2A to 2D. An order of the data within the time-multiplexed data stream may correspond to an order of the microphones in the microphone chain. The positioning of each microphone data within a transmission cycle may be insured by the delays of one clock period accumulated within the microphone chain. At the data input 14 of the controller 4, each new clock period may correspond to data received from a different microphone arranged down the line. The data generated by each of the microphones 2A to 2D may be transmitted to the controller 4 via a same serial data line. The controller 4 or an additional component (not illustrated) may be configured to demultiplex the time-multiplexed data received from the microphone chain such that data generated by the individual microphones 2A to 2D may be obtained.

Transmitting data via the microphone chain to the controller 4 may be based on at least one of a rising edge of the external clock signal or a falling edge of the external clock signal. In the example of FIG. 4, a ratio of the external clock rate CLK to the multiplexing clock rate Fclk may equal N, and each of the microphones 2A to 2D may transmit data at a falling edge of the external clock signal. In a further example, each of the microphones 2A to 2D may transmit data at a rising edge of the external clock signal.

In a further example, a ratio of the external clock rate CLK to the multiplexing clock rate Fclk may equal N/2. In such case, a first number of maximum N/2 microphones may transmit data at a falling edge of the external clock signal, and a second number of maximum N/2 microphones may transmit data at a rising edge of the external clock signal. If N is an even number, all of the falling edges and all of the rising edges may be used for a data transmission. If N is an odd number, at least one of a falling edge or a rising edge may remain unused for a data transmission. Referring to the microphone device 300 of FIG. 3 exemplarily including four microphones 2A to 2D, the first microphone 2A and the third microphone 2C may e.g. transmit data based on a rising edge of the clock signal while the second microphone 2B and the fourth microphone 2D may e.g. transmit data based on a falling edge of the clock signal.

Microphone devices in accordance with the disclosure and methods for operating thereof may provide various technical effects described in the following.

Referring back to FIG. 1, the microphone device 100 may include a first pair of microphones 2A, 2B and a second pair of microphones 2C, 2D. These pairs may be individually connected to the controller 4 by separate data lines or wires. That is, using the design or architecture of FIG. 1, an increasing number of microphones may multiply the number of required wires. In contrast to this, the microphones 2A to 2D of the microphone device 300 of FIG. 3 may be connected to the controller 4 via a same data line such that a reduced number of wires may be required compared to FIG. 1. A reduced number of wires may result in reduced costs and reduced logistics of the wires in the respective application, such as e.g. in a car. The number of wires may be particularly reduced for cases in which the controller 4 may not be arranged on a same board as the microphone chain.

The design of the microphone device 300 of FIG. 3 may be based on existing pin configurations. That is, the microphones of the microphone chain may not require additional pins for their arrangement in the microphone chain. In particular, an already existing channel select pin may be used as a data input of the respective microphone.

In the microphone device 300 of FIG. 3, the microphones 2A to 2D may be serially connected. Such arrangement may allow the microphones 2A to 2D to at least partly communicate with each other. Each of the microphones 2A to 2D may receive data from any of the other microphones. Such communication may be used for implementing smart features in the microphones chain. In this regard, data may be exchanged between the microphones. Such exchanged data may include at least one of diagnostic data, sensitivity matching data, wake-up data, etc. More general, the data transmitted via the microphone chain may include at least one of acoustic (or audio) data or non-acoustic data. The non-acoustic data may include at least one of diagnostic data or identification data of one or more of the microphones 2A to 2D. The diagnostic data may include information on at least one of an electronic defect or a mechanical defect of one or more of the microphones 2A to 2D. The identification data may include information on at least one of a type or a technical specification of one or more of the microphones 2A to 2D.

The method of FIG. 5 is specified in a general manner in order to qualitatively specify aspects of the disclosure. The method may be extended by any of the aspects described in connection with the foregoing drawings. The method may be configured for operating a microphone device including a number N of at least two serially coupled microphones forming a microphone chain. For example, the method may be used for operating the microphone device 300 of FIG. 3.

At 26, data may be transmitted from the microphones to a controller via the microphone chain, wherein the microphone chain may be configured to output time-multiplexed data transmitted by the microphones.

The method of FIG. 6 may be seen as a more detailed version of the method of FIG. 5. The method of FIG. 5 thus may be extended by any of the aspects described in connection with FIG. 6. For example, the method of FIG. 6 may be performed by one of the microphones 2A to 2D of the microphone device 300 of FIG. 3.

At 28, the method may start.

At 30, a counter may be reset. In particular, the counter may be reset to a value of zero. The counter may be part of the microphone or may be external to the microphone.

At 32, the considered microphone may store data which has been received at the data input of the microphone from a component arranged upstream of the considered microphone. A memory or buffer for storing the data may be part of the microphone or may be external to the microphone. For example, such memory may include a register configured to store at least one bit. Referring back to FIG. 3, the first microphone 2A, the second microphone 2B and the third microphone 2C may store data received from the microphone arranged upstream of the respective microphone. The fourth microphone 2D may store data received from the defined potential 24. For example, the defined potential 24 may correspond to a ground potential such that the fourth microphone 2D may store a bit value of zero.

At 34, the value of the counter may be increased by one.

At 36, it may be determined whether the counter value equals the number N of microphones of the microphone chain.

At 38, if the counter value does not equal N (see NO), the stored data may be transmitted to the component arranged downstream of the considered microphone.

At 40, the considered microphone may wait for the next clock period of the external clock signal and may again perform act 32.

At 42, if the counter value equals N (see YES), the considered microphone may transmit its own data (e.g. data generated by the considered microphone) to the component arranged downstream of the considered microphone.

At 44, the considered microphone may wait for the next clock period of the external clock signal and may again perform act 30.

EXAMPLES

In the following, microphone devices and methods for operating thereof will be explained by means of examples.

Example 1 is a microphone device, comprising: a number N of at least two serially coupled microphones forming a microphone chain, wherein: the microphones are configured to transmit data to a controller via the microphone chain, and the microphone chain is configured to output time-multiplexed data transmitted by the microphones.

Example 2 is a microphone device according to Example 1, wherein: each of the microphones is configured to receive an external clock signal provided by the controller, an external clock rate of the external clock signal being higher than a multiplexing clock rate, and the microphones are configured to transmit data to the controller via the microphone chain based on the external clock rate.

Example 3 is a microphone device according to Example 1 or 2, wherein data transmitted from the microphones to the controller is transmitted via a same serial data line.

Example 4 is a microphone device according to Example 2 or 3, wherein for N consecutive clock periods of the external clock signal, an output of the microphone chain comprises data provided by each of the N microphones.

Example 5 is a microphone device according to one of the preceding Examples, wherein each microphone comprises: a clock input for receiving the external clock signal, a data output for transmitting data to a component arranged downstream of the microphone, and a data input for receiving data from a component arranged upstream of the microphone.

Example 6 is a microphone device according to Example 5, wherein the data input comprises a channel select pin.

Example 7 is a microphone device according to one of Examples 2 to 6, wherein transmitting data via the microphone chain to the controller is based on at least one of a rising edge of the external clock signal or a falling edge of the external clock signal.

Example 8 is a microphone device according to one of Examples 2 to 7, wherein a ratio of the external clock rate to the multiplexing clock rate is N or N/2.

Example 9 is a microphone device according to one of Examples 2 to 8, wherein each microphone transmits data at a rising edge of the external clock signal or each microphone transmits data at a falling edge of the external clock signal.

Example 10 is a microphone device according to one of Examples 2 to 9, wherein: a first number of maximum N/2 microphones transmits data at a falling edge of the external clock signal, and a second number of maximum N/2 microphones transmits data at a rising edge of the external clock signal.

Example 11 is a microphone device according to one of Examples 2 to 10, wherein: each of the microphones is configured to convert the external clock rate of the received clock signal to the multiplexing clock rate, and a device internal audio processing is based on the converted multiplexing clock rate.

Example 12 is a microphone device according to one of the preceding Examples, wherein: a first microphone of the microphone chain is arranged at an end of the microphone chain, a data output of the first microphone is configured to be coupled to the controller, and a data input of the first microphone is coupled to an output of a microphone arranged upstream of the first microphone.

Example 13 is a microphone device according to Example 12, wherein: an N-th microphone of the microphone chain is arranged at an opposite end of the microphone chain, a data input of the N-th microphone is coupled to a defined potential, and a data output of the N-th microphone is coupled to an input of a microphone arranged downstream of the N-th microphone.

Example 14 is a microphone device according to Example 13, wherein: for a microphone of the microphone chain arranged between the first microphone and the N-th microphone: a data input of the microphone is coupled to an output of a microphone arranged upstream of the microphone, and a data output of the microphone is coupled to an input of a microphone arranged downstream of the microphone.

Example 15 is a microphone device according to one of the preceding Examples, wherein a coupling between the microphones and the controller is based on a PDM interface.

Example 16 is a microphone device according to one of the preceding Examples, wherein 2≤N≤8.

Example 17 is a microphone device according to one of the preceding Examples, wherein the microphone device is configured to be part of a speech application.

Example 18 is a microphone device according to one of the preceding Examples, wherein the microphone device is configured to be part of an active noise cancellation application.

Example 19 is a microphone device according to one of the preceding Examples, wherein the microphone device is configured to be part of an automotive application.

Example 20 is a method for operating a microphone device comprising a number N of at least two serially coupled microphones forming a microphone chain, wherein the method comprises: transmitting data from the microphones to a controller via the microphone chain, wherein the microphone chain is configured to output time-multiplexed data transmitted by the microphones.

While this disclosure has been described with reference to illustrative examples, this description is not intended to be construed in a limiting sense. Various modifications and combinations of the illustrative examples, as well as other examples of the disclosure, will be apparent to persons skilled in the art upon reference of the description. It is therefore intended that the appended claims encompass any such modifications or examples.

What is claimed is:

1. A microphone device, comprising:
a number N of at least two serially coupled microphones forming a microphone chain, wherein:
the microphones are configured to transmit data to a controller via the microphone chain,
each microphone, of the number N of at least two serially coupled microphones, comprises:
a clock input for receiving an external clock signal,
a channel select pin for receiving data from a component arranged upstream of the microphone, and
a data output for transmitting data to a component arranged downstream of the microphone, and
the microphone chain is configured to output time-multiplexed data transmitted by the microphones.

2. The microphone device of claim 1, wherein:
each of the number N of at least two serially coupled microphones is configured to receive the external clock signal provided by the controller, an external clock rate of the external clock signal being higher than a multiplexing clock rate, and
the number N of at least two serially coupled microphones are configured to transmit data to the controller via the microphone chain based on the external clock rate.

3. The microphone device of claim 1, wherein data transmitted from the number N of at least two serially coupled microphones to the controller is transmitted via a common serial data line.

4. The microphone device of claim 2, wherein for N consecutive clock periods of the external clock signal, an output of the microphone chain comprises data provided by each of the number N of at least two serially coupled microphones.

5. The microphone device of claim 2 wherein transmitting data via the microphone chain to the controller is based on at least one of a rising edge of the external clock signal or a falling edge of the external clock signal.

6. The microphone device of claim 2, wherein a ratio of the external clock rate to the multiplexing clock rate is N or N/2.

7. The microphone device of claim 2, wherein each microphone, of the number N of at least two serially coupled microphones, transmits data at a rising edge of the external clock signal or each microphone, of the number N of at least two serially coupled microphones, transmits data at a falling edge of the external clock signal.

8. The microphone device of claim 2, wherein:
a first number of maximum N/2 microphones, of the number N of at least two serially coupled microphones, transmits data at a falling edge of the external clock signal, and
a second number of maximum N/2 microphones, of the number N of at least two serially coupled microphones, transmits data at a rising edge of the external clock signal.

9. The microphone device of claim 2, wherein:
each of the number N of at least two serially coupled microphones is configured to convert the external clock rate of the received external clock signal to the multiplexing clock rate, and
each of the number N of at least two serially coupled microphones is configured to perform internal audio processing is based on the multiplexing clock rate.

10. The microphone device of claim 1, wherein:
a first microphone, of the number N of at least two serially coupled microphones, of the microphone chain is arranged at an end of the microphone chain,
the data output of the first microphone is configured to be coupled to the controller, and
the channel select pin of the first microphone is coupled to the data output of a microphone, of the number N of at least two serially coupled microphones, arranged upstream of the first microphone.

11. The microphone device of claim 10, wherein:
an N-th microphone, of the number N of at least two serially coupled microphones, of the microphone chain is arranged at an opposite end of the microphone chain,
the channel select pin of the N-th microphone is coupled to a defined potential, and
the data output of the N-th microphone is coupled to the channel select pin of a microphone, of the number N of at least two serially coupled microphones, arranged downstream of the N-th microphone.

12. The microphone device of claim 11, wherein in intermediate microphone, of the number N of at least two serially coupled microphones, of the microphone chain arranged between the first microphone and the N-th microphone comprises:
the channel select pin coupled to the data output of a microphone, of the number N of at least two serially coupled microphones, arranged upstream of the intermediate microphone, and
the data output coupled to the channel select pin of a microphone, of the number N of at least two serially coupled microphones, arranged downstream of the intermediate microphone.

13. The microphone device of claim 1, wherein a coupling between the number N of at least two serially coupled microphones and the controller is based on a pulse density modulation interface.

14. The microphone device of claim 1, wherein $2 \leq N \leq 8$.

15. The microphone device of claim 1, wherein the microphone device is configured to be part of a speech application.

16. The microphone device of claim 1, wherein the microphone device is configured to be part of an active noise cancellation application.

17. The microphone device of claim 1, wherein the microphone device is configured to be part of an automotive application.

18. A method for operating a microphone device comprising a number N of at least two serially coupled microphones forming a microphone chain, wherein the method comprises:
transmitting data from the number N of at least two serially coupled microphones to a controller via the microphone chain, wherein the microphone chain is configured to output time-multiplexed data transmitted by the microphones, and wherein each microphone, of the number N of at least two serially coupled microphones, comprises a channel select pin for receiving data from a component arranged upstream of the microphone, a data input for receiving data from a component arranged upstream of the microphone, and a data output for transmitting data to a component arranged downstream of the microphone.

19. A microphone device, comprising:
a number N of at least two serially coupled microphones forming a microphone chain, wherein:
the microphones are configured to transmit data to a controller via the microphone chain,
each microphone, of the number N of at least two serially coupled microphones, is configured to receive an external clock signal provided by the controller, an external clock rate of the external clock signal being higher than a multiplexing clock rate, and
the number N of at least two serially coupled microphones are configured to transmit data to the controller via the microphone chain based on the external clock rate.

20. The microphone device of claim 19, wherein data transmitted from the number N of at least two serially coupled microphones to the controller is transmitted via a common serial data line.

* * * * *